Nov. 11, 1947. W. H. COLBERT ET AL 2,430,452
COLORED MIRROR
Filed Jan. 25, 1943 2 Sheets-Sheet 1

INVENTORS
William H. Colbert
Willard L. Morgan
BY
Cubett, Moloney & Miller
ATTORNEYS Nov. 11, 1947.　　W. H. COLBERT ET AL　　2,430,452
COLORED MIRROR
Filed Jan. 25, 1943　　　　2 Sheets-Sheet 2

INVENTORS
William H. Colbert.
Willard L. Morgan.
BY
ATTORNEYS

Patented Nov. 11, 1947

2,430,452

UNITED STATES PATENT OFFICE 2,430,452

COLORED MIRROR

William H. Colbert, Brackenridge, Pa., and Willard L. Morgan, Columbus, Ohio, assignors, by mesne assignments, to Libbey-Owens-Ford Glass Company, Toledo, Ohio, a corporation of Ohio Application January 25, 1943, Serial No. 473,473

15 Claims. (Cl. 88—105)

Our invention relates to colored mirrors. It has to do more particularly with the production of mirrors having desired color and reflectivity characteristics. More specifically, it relates to the production of mirrors of desired color wherein the color is obtained by producing interference of light rays which strike the mirrors.

Despite the wide possible use of colored mirrors in furniture, store decoration, theater decoration and other decoration, sales displays, etc., and as automotive mirrors, and the possible use of colored reflective surfaces to add to the attractiveness of shaped glassware, there has been little use to date of such mirrors and surfaces due to the expense of producing them and the few shades available.

The accompanying drawings will aid in the understanding of our invention. In these drawings.

Figure 1:
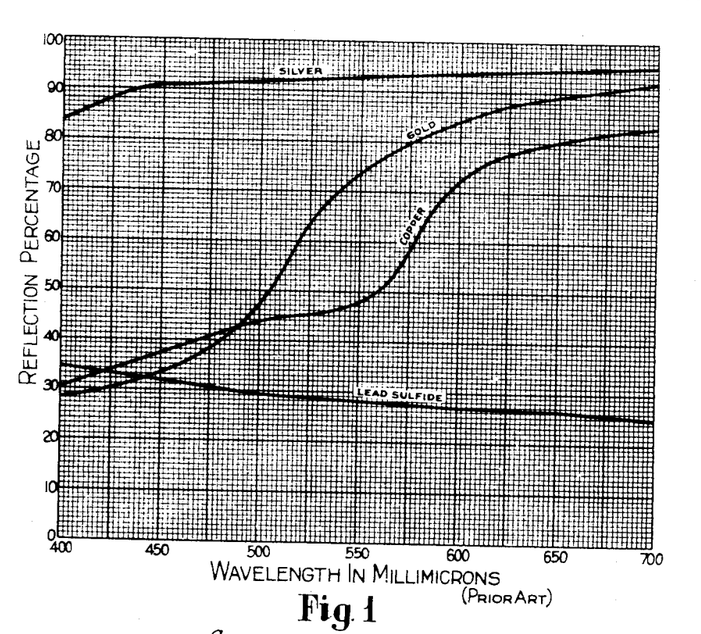
Figure 1 is a diagram showing spectral reflection curves for silver, gold, copper and lead sulfide mirrors of the prior art.

Silver mirrors, of 88–92% reflectivity value, made with clear ordinary plate glass have no color, since all the various light rays are reflected approximately equally, as seen from the spectral reflection curves in Figure 1. Some colored mirrors have been used commercially which were made by silvering colored glass, the color thereby secured being the color of the glass. The color of the glass arises from the fact that the glass absorbs some types of light rays more than others and the light rays which are transmitted, with the least absorption, thus impart the color to the glass. Thus, green glass is green because it absorbs much of the red and blue light out of the white daylight as such light passes through the glass. A green mirror, made with silver on the green glass, shows a reflectivity value, for visible light, of 61% and similar mirrors, made with a blue glass and a flesh colored glass, showed reflectivity values of 35% and 68.5%. These are all lower than the reflectivity value of silver on the colorless glass, by reason of the loss of the colored light, which the colored glasses absorb. The use of such colored glasses is expensive and, moreover, satisfactory quality for forming mirrors is not readily available.

Using plain plate glass, some colored mirrors have been made in which the color arises from the selective reflection of the various light waves of different colors to different degrees. Thus, gold mirrors show a spectral reflection curve, as shown in Figure 1, and copper mirrors show a spectral reflection curve, as shown in Figure 1. The gold mirror appears yellow because little green or blue is reflected while much larger amounts of yellow and red are reflected, the overall reflectivity of total visible light for gold mirrors being about 75%. The copper mirror, which reflects about 55% of all light, is orange-red, being different from the gold mirror in that most of the light reflected is red. Copper mirrors have not been commercialized due to the unreliable methods for their production. Gold mirrors are expensive and, therefore, have not gone into wide use.

The use of fuchsin or methyl violet dyestuffs in opaque layers for mirror surfaces has been suggested. Such surfaces reflect 11.6% of the total visible light. Experience with such mirrors indicates that where such dyes are used as the reflective layer they must be present in fairly thick opaque layers and the reflectivity percentage is always low and the mirrors quite dark. The colors secured are invariably the complementary color to the normal color of the dyestuff when seen in solutions by transmission. Thus, methyl-violet gives a green mirror since the film transmits red and violet light and reflects, selectively, the green light which it does not transmit. Thus, the color in these mirrors arises solely by selective reflection, just as is the case with gold, which when viewed by transmission is green, the gold being relatively transparent to green light but opaque to the red and and yellow light which it reflects selectively. Mirrors of this type are not stable, the films rapidly breaking up and spotting and in service the color soon changes to muddy non-reflective grays. As a result they have had no commercial use in spite of the demand for colored mirrors.

Mirrors made with platinum, iridium, or aluminum are silvery in appearance and without color, while those made with chromium, silicon, or lead sulfide are dark and without color tone. Likewise glass coated with asphalt or black paint, with reflectivity values of 5%, and mirrors of black opaque glass, with 5% reflectivity, are not very useful because of their extremely low reflectivity values and the very dark images which thus appear in such reflective surfaces.

Thus, despite the wide possible use of colored mirrors and colored mirror surfaces, there has been little use to date because of the expense of producing such mirrors and surfaces and the few colors and shades available, as shown above.

One of the objects of our invention is to provide colored mirrors or other reflective surfaces of a wide range of color characteristics and of a wide range of reflectivity percentage characteristics which can be controlled as desired.

Another object of our invention is to provide mirrors or other reflective surfaces of various colors and reflectivity values in which the colors are mainly secured by light interference effects and are permanent and inexpensive.

Various other objects will be apparent from the following description.

The colors which appear in thin-walled soap bubbles and in very thin oil films do not arise from any inherent color in the soap film or in the oil. Also, in these cases, it is well recognized that the colors do not come from any selective color light-absorption effects, as the soapy water and oil do not show any color directly. As the soapy water and oil in bulk are also clear and transparent and non-reflective, it is apparent that the colors do not arise from any selective reflection of light. The colors are known to occur from interference of the light rays, which results in a neutralization or loss of certain colored lights and the residual light which then appears, is, obviously, colored. The particular color of light ray removed by interference is dependent upon the thickness of the film and its refractive index, as will be shown later. It is well known that interference colors can only appear in extremely thin films which are of a thickness comparable to one-fourth the wave length of light and which are at least partially transparent.

We have found that by depositing reflective coatings of various materials in extremely thin films which are still partially or considerably transparent, we can secure a wide range of colored mirrors of various reflective characteristics for the various rays of light and in terms of total light reflection. We obtain these effects by simple and inexpensive means and colored substances or colored glass are not necessary. The colors are permanent and do not fade or alter, as they are dependent upon physical light interference effects.

We have found that by the controlled deposition of very thin uniform semi-transparent films of many materials we can secure reflecting bodies of a wide range of color and reflectivity characteristics. The material used as the reflecting substance need not have any inherent color.

Figure 2:
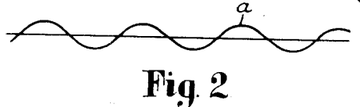
Figure 2 is a diagram illustrating light waves of a single ray of a definite color.
Figure 3:
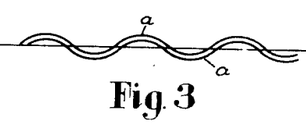
Figure 3 is a diagram illustrating light waves of two rays of the same type vibrating in the same wave phase.
Figure 4:
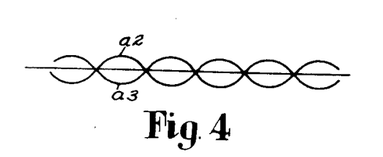
Figure 4 is a view similar to Figure 3 but showing the rays vibrating in opposite phase.

The development of colors by light interference has been explained upon the basis that light radiations are of a wave form, such as shown in Figure 2, which represents a single ray $a$ of a definite color. Blue light differs from red in that the length of the waves is shorter, in the case of the blue, and longer, in case of the red. The other visible colored rays of light are of intermediate wave lengths. White light is composed of a mixture of all of these visible rays. If two rays $a$ and $a'$ of the same monochromatic type or wave length happen to be vibrating in the same wave phase, as in Figure 3, they amplify each other and the intensity is increased. However, if they happen to be vibrating in opposite phase, as shown at $a^2$ and $a^3$ in Figure 4, they interfere with or oppose each other and a loss of light intensity results. Thus, if in some way we can make some of the blue rays in ordinary white light get out of phase with other blue rays of the same wave length, we can remove some of the blue from the ordinary light. The remaining light will then no longer be white but of a color resulting from the remaining green, yellow, orange and red rays and will appear a reddish-yellow color.

Figure 5:
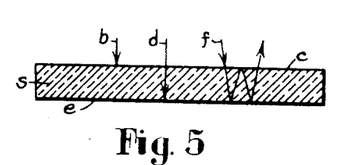
Figure 5 is a diagram illustrating how various light rays will be reflected from a reflecting surface.

If we consider two light rays impinging upon a reflecting substance $s$, as in Figure 5, and assume that ray $b$ is reflected at the top surface $c$ while ray $d$ passes on through the semi-transparent base $s$ to the bottom surface $e$ before it is reflected, it is apparent that the second ray has had a longer path to travel before it again emerges from the top surface $c$ of the layer $s$. Thus, the ray $d$ lags considerably behind the ray $b$ and in consequence, the crests and troughs of the waves of the two rays may not necessarily coincide. The time difference between the waves of rays $d$ and $b$ can be arranged so that the difference in phase is such that interference of the waves of two of such rays, entering or being reflected at any point on the surface of $s$, will occur. The time difference between the waves of the two rays will be dependent upon the thickness of the layer $s$ and the speed with which the given light ray travels in the material comprising the layer $s$.

As the number of complete wave cycles which any given monochromatic light ray makes per second or its frequency is a fixed constant, the variation in speed of travel of the light ray in different media causes a shortening or lengthening of the actual length of a wave as it travels through the various media. Wave lengths for light are generally given with reference to their values in traveling through air and the speed of travel for all light rays in this medium is given as 299,910,000 meters per second. In denser materials, the light rays move slower and all the light rays do not necessarily move at the same speeds. The proportionality constant N between the velocity of light in a given substance and the velocity of light in air is called the refractive index for that substance.

$$N = \frac{\text{Velocity in air}}{\text{Velocity in substance}} = \frac{\text{Wave length in air}}{\text{Wave length in substance}}$$

If by $\lambda_a$ we indicate the wave length in air and by $\lambda_s$ the wave length in some other substance, it is apparent that these are simply related as follows:

$$\lambda_s = \left(\frac{1}{N_s}\right)\lambda_a$$

N varies somewhat with different monochromatic waves of different wave length but a similar equation holds for each wave length considered. In general, as the variations are usually small, a single constant for N can frequently be applied for all waves in the visible light range.

In order for the ray $d$ to come out of the top surface and be 180 degrees out of phase and to thus interfere with the ray $b$, assuming both rays to be striking the surface of the layer substantially at right angles, the ray $d$ must be slowed down in time and distance equal to the distance of one half of a wave length of the ray in air, i. e., $$\frac{\lambda_a}{2}$$

As the ray is traveling only $1/N$ as fast in the substance $s$, comprising the layer, and must traverse the thickness of the layer twice, the thickness of $s$ required to cause an equivalent slowing effect is then $$\frac{\lambda_a}{4N_s}$$

In a similar way, thicknesses equal to 1, 3, 5 or any uneven integral multiples of this quantity should also show interference effects. If the ray $d$ is reflected within the layer $s$ not once but two times, it is apparent that the film needed for interference need be only $$\frac{\lambda_a}{8N_s}$$

thick. Thus, as shown in Figure 5, wherein the ray $f$ is shown as an inclined ray striking the surface of the layer the light ray is reflected twice within the layer. If the ray is reflected any number of times, such as R times, then the film needed is thinner and is of a necessary thickness as given by $$\frac{\lambda_a}{4N_sR}$$

Furthermore, it is apparent that similar thicknesses equal to 1, 3, 5 or any uneven integral multiples of such quantities will show interference effects with rays which are multiply reflected within the layers. Thus, the suitable film thicknesses for our films are of the order of one-fourth of a wave length of any visible light ray or some small multiple or submultiple of this, divided by the refractive index of the material used in the film.

Since the various colored rays of light have different wave lengths and these range from 4000 to 7500 Angstrom units or 0.4 to 0.75 micron or thousandth millimeter in the visible spectrum, it is obvious that a film which is thick enough to cause interference with the short blue rays will not cause interference with the long red rays, etc. Thus, each thickness of film will take out certain defined portions of the spectrum and a film will take on a series of different colors as the thickness is varied. As will be shown in the examples which follow, the colored mirrors of our invention produced by light interference, show varied colors, depending upon the thickness of mirror film employed. In the spectral reflection curves for these mirrors, the portion of the curve and minima of reflectivity caused by interference shifts from the blue range of wave length toward the red, as the film is made thicker. The film must be of very uniform thickness, if the color is to be the same throughout the mirror. This has called for special means of producing such mirrors, in view of the extreme uniformity and extreme thinness of the mirror layers desired. On the other hand, it is within the scope of our methods to produce colored mirrors of mottled or variegated colors where the film thicknesses are deliberately varied to cause such effects.

Interference effects in perfectly transparent materials do not occur beyond about the ninth multiple of the quarter wave length factor already described. In semi-transparent materials, the increasing absorption of light by the increasing thickness of film, which is exponential with respect to the thickness, may soon leave so little light reflected from the bottom surface $e$ that no interference effect can be found in the reflected light which is then coming entirely from the top surface $c$. Obviously if a mirror is opaque all of the light is absorbed before ever striking the surface $e$ and, therefore, no light is thrown back to cause interference effects, particularly as the film obviously must be traversed twice if interference is to be obtained. Since most commercial mirrors have been made with mirror layers thick enough to be opaque, they have not shown any interference colors and their entire reflection occurs at the top surface of the mirror layer. The occurrence of interference by multiple reflection within the layer, as shown in Figure 5 with ray $f$, is very quickly limited by the transmission values for the film and, in practice, we have not found evidence for more than two to four such internal reflections although more may occur in more highly transparent films.

It is thus apparent that the amount of light which may be reflected from the bottom surface $e$ of the semi-transparent mirror film is a function of the transparency of the material used, for the wave length being considered or the wave lengths constituting ordinary visible light. As this is the light available for interference in most cases for our mirrors, we use films which are semi-transparent or which show a transmission between 10 and 90% in the thicknesses employed.

The amount of light reflected from the top surface of the layer is a function of the refractive index, being greater the larger the refractive index for the substance, and we find it also becomes greater as the thickness of the film increases until it is opaque. While it may thus be an advantage to use a material for the mirror film which has a high refractive index to secure greater brilliancy of reflection and to permit the use of thinner, more transparent films, thus giving greater efficiency of light removal by interference and thus giving purer and deeper color tones, we do not restrict ourselves to the use of any particular range of refractive index materials but may use a wide range of substances. It is apparent that a material of about 50% reflectivity value, when viewed in a normally opaque thick film, which can be laid down in very thin films which are of high transparency, will show the brightest and deepest interference colors as mirrors. We may, however, use materials which in their ordinary opaque films or in bulk show much higher or lower reflectivity values than this and are not restricted to any range in this constant, although values lying between 80 and 20% are preferred. Thus, thin calcium fluoride coatings will reflect something less than 10% of the light at the top surface and are very transparent and the reflected light coming from the back surface causes interference colors to develop but the depth of color resulting is low due to the white light mixed with the colored light being of a high intensity. It is necessary that the film used for our mirrors have the characteristic of giving specular or mirror type reflection of light, since diffuse type reflection is not satisfactory.

We have found the use of very thin films of lead sulfide to give particularly attractive results. In its use in the normal opaque mirrors of fairly thick films, it is a practically colorless mirror, as shown by Figure 1, which shows the reflectivity, about 30%, for all the wave lengths of light to be about the same. It has a high refractive index of 3.9 and is quite transparent in the thicknesses which will cause interference effects. Gold, having a refractive index of 1.18 at 4400 Angstroms and of 0.47 at 5890 with a normal reflectivity curve, as shown by Figure 1, is quite transparent in very thin films to green light. So also is copper which reflects, as shown in Figure 1, when in opaque films and which has a refractive index of 1.10 at 5000 Angstroms and 0.44 at 6500. Both of these may be used by us in providing mirrors of a range of colors, when used in films which are semi-transparent and which are sufficiently thin to cause color development through light interference effects. Other sulfides of a metallic luster, such as stibnite and molybdenite, having a refractive index of 4.3, and each of about 40% general reflectivity in the visible range with a slight bluish cast, are quite suitable. Pyrite, which reflects a maximum of 60% in the red and a minimum of 45% in the blue, may be used as may also silicon, normally of about 38% reflectivity, and having a refractive index of 3.8 to 4.2. Antimony, having a refractive index of 1.62 and a reflectivity of about 55%, can possibly be used. Fluorite or calcium fluoride, having a refractive index of 1.43, and other fluorides of about the same refractive index, may be used as a reflective layer, although these very transparent substances are of low reflectivity values, as previously mentioned. Thus, for fluorite the estimated reflectivity value would be 3 to 4% uniformly throughout the visible range and very thin films of this material give low reflectivity value reflectors of this order which are of light interference tints.

It is also possible to use films, which are in the desired extreme thin range and which cause interference coloration of mirror type reflectors, in which the film is a jointly deposited mixture, chemical combination, or alloy of film-forming materials. For example, a jointly deposited mixture of gold and lead sulfide is suitable. It is obvious also that two or more extremely thin laminae, both semi-transparent, of two different substances may be used cooperatively to secure the interference colors.

While no color need be present in the material used as the reflecting substance, such as in the case of lead sulfide, the use of such materials as gold, showing selective specular reflection, brings an additional source of possible variation of both the hues and spectral reflectivity characteristics. The choice of a material for the reflective film which has color characteristics in its normal reflection, such as gold, imposes its normal reflection spectral limits, to some degree, on the general nature of the light reflected by the film and from which various spectral components are then substracted by the light interference effects, depending on the thickness of the film used and its refractive index. Thus, in general, mirrors made with a very thin gold film are of higher total reflective values and thus brighter, and also of particularly higher reflectivity in the yellow and red, than are similar mirrors having films of lead sulfide, although in each the color is derived, to a main degree, by the color interference effects in combination with the normal reflective characteristics. Thus, with the lead sulfide which, as a normal opaque mirror, reflects all colors about equally at around 30%, as shown in Figure 1, the interference mirrors secured do not greatly exceed 30% in reflectivity value and the whole spectral range of colors are found in the mirrors so produced. With the very thin copper film mirrors, in which interference is acting, the reflectivity values do not exceed 55% and the colors secured are mainly bright reds, the blue and green waves being definitely weak. Similarly, cuprite or cuprous oxide, which is a bright red and giving a reflectivity in bulk of about 20% and has a refractive index of 2.7, can be used as a film base for interference color development and mirrors of the complete spectral range can be secured. Ordinary cupric oxide has been found to be extremely satisfactory in making mirrors colored by light interference effects.

Not all materials may be used for the forming of our thin semi-transparent mirror films in order to produce interference colors. Silver has been the mirror material most widely used as the ordinary opaque type mirrors and has also been used some as a colorless semi-transparent so-called "half mirror." However, metallic silver is not useful for the making of our mirror films. This arises from the fact that all three factors which must be considered in producing our films are of extreme and unfavorable values in the case of silver. First, its high reflectivity, 90% in bulk, permits little light to be passed to the second or back surface $e$ of the thin films. Second, the films of silver have an extremely high absorption capacity for light and none of the small amount of light, which might possibly get to surface $e$, gets back again to the top surface. Consequently, there is no light to cause interference effects or colors. The absorption coefficient for light in the visible range is 10 to 30 times greater for silver as compared to similar thicknesses of other metallic substances. Silver is thus a very highly opaque substance. Third, it also has a very low refractive index, this being 0.17 for the visible range and, in consequence, quite thick films would be necessary to cause interference effects. Thus, for green light of 5000 Angstrom units or 0.5 micron wave length $$\frac{\lambda_a}{4N_s}$$

calculates as 0.74 micron. At this thickness, silver shows a transmission figure of only 1.5%, and as the reflected ray which arrives at the top surface $c$ must traverse an equal thickness it is apparent that the amount of light which might get back to surface $c$ and cause interference would be only 1.5% × 1.5% or 0.02% which would be entirely negligible. Most commercial silver mirrors are 0.10 to 0.12 micron thick. Aluminum, which is of equally high reflectivity and a refractive index of 1.44 and a fairly high degree of opacity, is also not useful in forming mirrors colored by interference for similar reasons.

While our mirrors receive their colors from the thin reflective film used, it is apparent that we can also modify the range and reflective characteristics secured by our mirrors, thus primarily colored by interference effects, by using in place of colorless glass, as the mirror support, a colored glass or other colored support body of transparent nature. The color absorption characteristics of the support will limit the total reflectivity percentage possible and shift the general tones of color in the direction of the color of the glass used.

In order to secure the necessary uniformity of thickness in the thin semi-transparent mirror films and thereby secure uniformity of color and reflectivity characteristics throughout a mirrored body and to secure control of the variation in thickness of the very thin films desired, we have found it necessary to develop special methods of forming our mirror film.

Where the mirror films are deposited chemically, the deposition reactions must be greatly retarded, as compared with former operations. Thus, the reaction mixtures and temperatures of deposition must be changed toward slowing down the entire deposition process so as to give more uniform and even development of crystal nuclei and even slower than normal rates of growth onto these nuclei. This deposition process is described more fully in our co-pending application directed to Method of making colored mirrors, executed on the 21st day of January, 1943, Serial No. 473,474.

Figure 6:
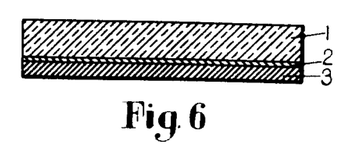
Figure 6 is a transverse vertical sectional view of a mirror made according to our invention.

We find the deposition of our very thin films by thermal evaporation of the substance within a high vacuum to be a particularly attractive method as uniform results are readily secured and the control of the desired thickness is quite simple. As the extremely thin coatings are frequently quite fragile and easily scratched or otherwise spoiled, we generally coat these with a pigmented or other non-reflective paint, lacquer or shellac coating. This also eliminates viewing of the background through the semi-transparent mirror and prevents any appreciable amount of light passing through the mirror from back of the coating. The sectional view of Figure 6 illustrates a second surface mirror, made according to our invention, and which will consist of a glass or other support 1, the semi-transparent continuous mirror film 2 and the protective coating 3.

The nature of our new mirrors and their means of formation will be apparent from the following examples. In Examples Nos. 1 to 16, the mirror base material is lead sulfide deposited by special chemical means, the examples being of different film thickness and of consequent different colors and spectral and total light reflective characteristics, the various mirrors being secured by varying the time of deposition of the lead sulfide under controlled conditions.

*Examples 1 to 16*

Ordinary plate glass is thoroughly cleaned, scrubbed with rouge and then rinsed thoroughly several times. The wet glass is then ready for mirroring. The mirroring is carried out at 68 degrees Fahrenheit and the solutions, glass and machines are all brought to this temperature by doing all the work in a constant temperature room regulated to this condition. This gives uniform conditions and with the mirroring solution used, the deposition proceeds at a constant rate so that the thickness of deposit is determined by the time the solution is permitted to act. Three aqueous solutions are made up for use as follows: Solution A, which contains 3.18% of sodium hydroxide and 0.00054% of sodium potassium tartrate. Solution B, which contains 3.7% of lead acetate and 0.264% of acetic acid. Solution C, which contains 2.64% of thiourea. These three solutions are mixed together in equal quantities just prior to their being poured onto the glass. The mixed solution at the time of pouring is of the following composition:

| | Per cent |
|---|---|
| Sodium hydroxide | 1.06 |
| Lead acetate | 1.23 |
| Thiourea | 0.88 |
| Acetic acid | 0.088 |
| Sodium potassium tartrate | 0.00018 |

As compared with the method of forming lead sulfide mirrors shown in the patent to Colbert et al., 1,662,564, of March 13, 1928, it is seen that we use a higher concentration of lead acetate and a lower concentration of thiourea. These changes have the effects of increasing to some degree the laying down of the nuclei uniformly and of slowing down the rate of reaction. These effects are also enhanced by the use of a temperature of 68 degrees Fahrenheit in contrast to the 95 degrees or higher ordinarily employed in depositing lead sulfide mirrors. However, these changes alone have been found to be insufficient as it generally occurs, when mirror deposition is slowed down, that the securing of uniform deposits becomes more difficult. As it is particularly necessary that the thin mirror films be extremely uniform because of their consequent variation in color, if not, and also because of their semi-transparent nature, we have found it necessary to add a new substance having a retarding effect on the deposition rate and one which facilitates very uniform deposition. This substance is preferably sodium potassium tartrate. It is believed that the sodium potassium tartrate, which is used in very small amounts as it has a substantial effect, operates by possibly decreasing greatly the rate of growth of lead sulfide on already deposited nuclei. Thus, greater numbers of nuclei are apparently caused to form and the growth on these nuclei becomes slow and uniform in every direction and as a result a continuous deposit is formed. While the deposition rate of the formula of Patent 1,662,564 can be decelerated by working even below 68 degrees Fahrenheit or by using less alkali, neither of these procedures will give satisfactory uniformity for the making of good interference colored mirrors. The use of the small amount of sodium potassium tartrate is thus very desirable, although we have found that other materials may be used as retarders, as indicated in our said co-pending application.

In order to overcome the limiting of the amount of solution in contact with the glass at its edge by surface tension effects and the variation in deposit thickness at the edges, as a consequence, we have found it preferable, in order to secure very uniform results, to place the wet glass to be mirrored in a stainless steel pan, precoated with lead sulfide, and to rock the pan about 35 times a minute using a metal frame insert in the bottom of the pan to keep the glass from shifting. Approximately 2.8 cc. of mixed solution per square inch of glass to be treated is poured over the glass in the tray and the rocking keeps this liquid uniformly flowing over the surface of the glass during the entire deposition.

With our new mixed solution, after about 8.5 minutes from the time of pouring, a darkening of the glass can first be noticed and the thickness of mirror film becomes progressively greater as the time increases. If the deposition is allowed to proceed for about 60 minutes, a completely opaque ordinary type lead sulfide mirror is secured, in which the thickness of coating is about 0.140 microns. Mirrors of this thickness with lead sulfide are usually laid down in about 7 minutes, using the solution of Patent No. 1,662,564, and these mirrors show no color, as indicated by the spectral reflection curve of Figure 1, and are opaque. For the spectral reflectivity curve shown, the total reflectivity is 29%.

By adding a large amount of water to the pans at the times indicated in the following table, the mirrors comprising Examples 1 to 16 were made and are of the various colors and spectral and optical characteristics shown. Diluting the solution with a large amount of water stopped the deposition reaction. The mirrors were then flushed with considerable water and the surface cleaned by gently rubbing with wet cotton. After being dried, preferably by warm air, the films, which were semi-transparent as shown, were immediately coated with a black lacquer and then with a thick coat of a pigmented paint for protection against scratching or other destructive influences.

pendent upon the color of the light removed by interference. Thus, in Example 10, the light removed by interference is in the red and, in consequence, the mirror appears blue since this is the main residual type of light.

The second spectral series of colored mirrors, namely, Examples 11 to 16, show minima in the reflectivity spectra at the thicknesses of film given which correspond to the ratio of $$\frac{5\lambda}{16N}$$

Interference at these thicknesses would be only

| Example No. | Time of Forming, Minutes | Color | Total Per Cent Reflectivity | Total Per Cent Transmission | Spectral Minimum | Film Thickness, Microns | Wave Factors | No. of Times Ray Reflected |
|---|---|---|---|---|---|---|---|---|
| 1 | 12.3 | Bluish Gray | 33.8 | 45 | 7,500 | .024 | $\frac{\lambda}{8N}$ | 2 |
| 2 | 13.3 | Pale Yellow | 35.7 | 42 | 4,000 | .026 | $\frac{\lambda}{4N}$ | 1 |
| 3 | 14.2 | Bright Yellow | 34.4 | 40 | 4,400 | .028 | $\frac{\lambda}{4N}$ | 1 |
| 4 | 15.2 | Orange Yellow | 31.7 | 37 | 4,700 | .030 | $\frac{\lambda}{4N}$ | 1 |
| 5 | 16.1 | Red Yellow | 28.2 | 35 | 4,950 | .032 | $\frac{\lambda}{4N}$ | 1 |
| 6 | 17.7 | Purple Red | 24.9 | 33 | 5,250 | .034 | $\frac{\lambda}{4N}$ | 1 |
| 7 | 18 | Red Purple (Mauve) | 21.6 | 30 | 5,500 | .036 | $\frac{\lambda}{4N}$ | 1 |
| 8 | 19.4 | Purple | 21.2 | 28 | 5,900 | .038 | $\frac{\lambda}{4N}$ | 1 |
| 9 | 20.6 | Purple Blue | 20.9 | 26 | 6,300 | .040 | $\frac{\lambda}{4N}$ | 1 |
| 10 | 22.6 | Clear Blue | 19.8 | 23 | 6,850 | .044 | $\frac{\lambda}{4N}$ | 1 |
| 11 | 23.3 | Blue Green | 20.0 | 21 | 7,300 | .046 | $\frac{\lambda}{4N}$ | 1 |
| 12 | 24 | Grayish Pale Yellow | 21.8 | 19 | 4,600 | .046 | $\frac{5\lambda}{16N}$ | 1 |
| | | | | | 4,800 | .047 | $\frac{5\lambda}{16N}$ | 1 |
| 13 | 24.4 | Grayish Yellow | 23.2 | 18 | 4,950 | .048 | $\frac{5\lambda}{16N}$ | 1 |
| 14 | 25.6 | Grayish Red | 24.8 | 17 | 5,200 | .050 | $\frac{5\lambda}{16N}$ | 1 |
| | | | | | 7,200 | .050 | $\frac{3\lambda}{8N}$ | 2 |
| 15 | 28.5 | Grayish Purple | 24.8 | 16 | 5,800 | .056 | $\frac{5\lambda}{16N}$ | 1 |
| 16 | 33.2 | Silvery Blue | 21.8 | 12 | 6,700 | .065 | $\frac{5\lambda}{16N}$ | 1 |

Figure 7:
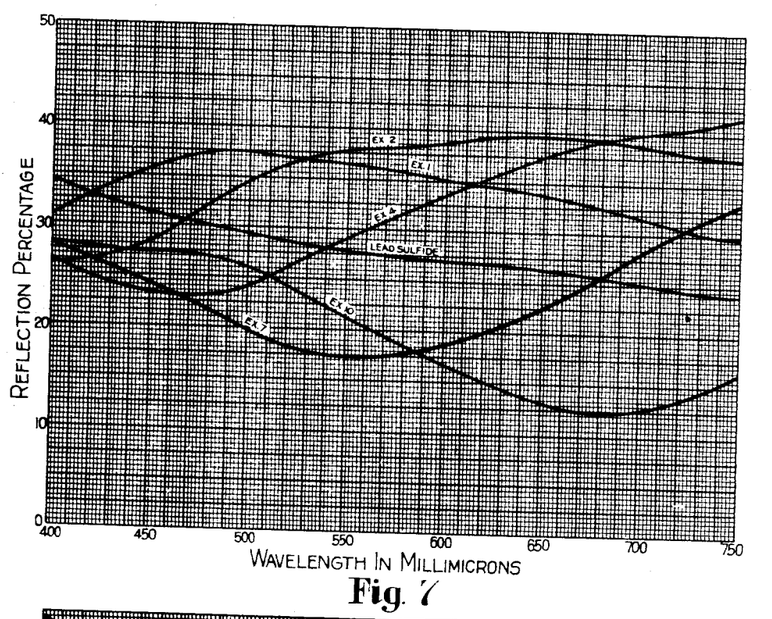
Figure 7 is a diagram illustrating spectral reflection curves of certain examples of mirrors made according to our invention.
Figure 8:
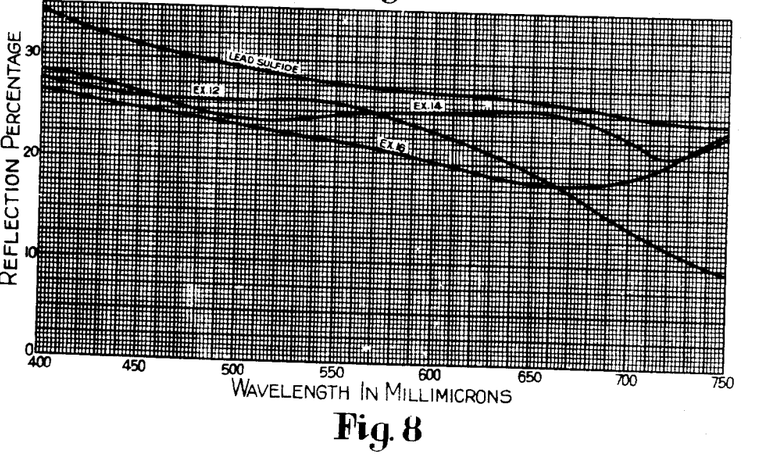
Figure 8 is a view similar to Figure 7 illustrating spectral reflection curves of certain other examples of mirrors made according to our invention.

Each of the mirrors was perfectly uniform in color and a good reflector. As will be seen in the table, the spectral range was gone through twice. In the first series of colors, as shown in Examples 1 to 11, the color tones are very clear and bright. The spectral reflectivity curves for Examples 1, 2, 4, 7 and 10 are shown in Figure 7, the numbering of the curves being the same as the example numbers. For comparison, the spectral reflectivity curve of the ordinary opaque film lead sulfide mirror given in Figure 1 is drawn into this set of curves, as well as into Figure 8 which shows the spectral reflectivity for colored mirror Examples 12, 14 and 16. The minima in the spectral reflectivity curves show the light rays which are being diminished in the reflected light by interference. As would be expected for interference effects, the minima continually shift in the samples toward the longer red rays as the film thickness of the lead sulfide in the examples is increased. In Examples 2 to 11, the film thickness, at which the interference minima occur with the different light waves, is related to the wave length by the ratio of $$\frac{\lambda}{4N}$$

The apparent color of the mirror is plainly departial and the minima in the curves are very shallow. As a result, the colors are not of as bright or distinct tones as occur in the first series of mirrors.

In mirrors Examples Nos. 1 and 14, reflected interference rays and minima occurred in the deep red end of the spectra at film thicknesses corresponding to $$\frac{\lambda}{8N} \text{ and } \frac{3\lambda}{8N}$$

respectively. In these, the red rays were evidently reflected twice within the mirror film before emerging, as illustrated in Figure 5 by ray $f$. The lead sulfide film is highly transparent in the deep red and this higher transparency makes interference by the doubly reflected red rays possible.

By way of further proof and demonstration that the colors originate from interference effects, the depth of the decrease in the light at the minimum in Example No. 7 will be calculated. The minimum occurs at 5500, where the reflection from Figure 4 of opaque lead sulfide is 28%. Some 72% of the ray 5500 passes into the semi-transparent lead sulfide film which, in the thickness present, was 30% transparent. However, the ray must also travel back through the same thickness again and if no light is lost in the reflection from the bottom surface of the lead sulfide film, as appears to be the case, the amount of light returned to the top surface of the lead sulfide would be 72% × 0.30 × 0.30 or 6.1%. This would destroy an equal amount of the same 5500 light or the total loss should be 12.2%. Thus, the reflectivity for 5500 should be 28% — 12.2% for this film or 15.8% and the spectral reflectivity curve, for Example 7, shows a reflectivity for 5500 of 17.5%, which is close to the expected figure. In a similar calculation for Example 10 for the ray 6850, the calculated interference ray would destroy 8% and indicate a net reflectivity of 18% for this red ray. The actual reflectivity is lower, being only 12.5%, and is in line with the fact that as lead sulfide is more transparent to red rays than to light generally, then more light would be thrown back to cause interference than use of the general light transmission of 23% would indicate.

As illustrated in Figure 7, where the films are extremely thin they show higher reflectivity values than the lead sulfide in its opaque films. Here the waves reflected at the even quarter wave length, differences of path which are in phase with the light being reflected at the surface, amplify the light intensity and as the films are extremely thin and highly transparent, a considerable amount of light is reflected from the bottom surface of the film which adds itself to the light reflected from the top surface. Thus, in Example 2, the red ray 6500 shows a reflectivity of 39.5%. In Figure 1, the opaque lead sulfide reflects this ray to the extent of 26.5% and hence 73.5% of the light goes inside of the mirror film. Example 2 shows a transmission of 42% and the film must be traversed twice. Consequently, the light reflected from the bottom surface of the semi-transparent mirror layer, which again gets out at the top surface of the lead sulfide layer, is 73.5% × 0.42 × 0.42 or 13%, which added to 26.5% reflected from the top surface, gives a total of 39.5% reflectivity for the red 6500 by the Example 2 mirror. This amplification by reflection from the bottom layer is of smaller consequence as the films become thicker and less transparent.

*Example 17*

A wine glass, or other hollow glass article, of ordinary colorless glass may be thoroughly cleaned and brought to 68 degrees Fahrenheit and the mixed solution used in the previous examples flowed into the same while maintaining agitation within the glass by a mechanical stirrer. In this way we can secure a reflective coating on the interior of the glass article. It will be a clear blue color, if the solution is poured out at the end of 22.6 minutes and the action stopped by flushing the glass with water. In a similar way other shaped transparent articles may be given a colored metallic reflection and the color may be varied, as in the previous examples, by varying the time of deposition.

*Example 18*

A plastic button, made from a plastic such as methyl methacrylate or phenol formaldehyde condensation plastic, is thoroughly cleaned and placed in the mixed solution used in the previous examples. The solution is preferably in a rotating container which continuously turns the button over. The solution may be drained out at the end of 15.2 minutes and flushed out with water. The button will be coated with a film of lead sulfide which will be of such a thickness as to give a bright orange yellow color. The button will have a high metallic reflection.

*Example 19*

If in preparing mirrors of Example 6 we arrange to blow a fine gentle current of air on the top of the glass plate, while it is in the pan being coated, and do so at several points, the resulting mirror will not be of one uniform color throughout but will show a variegated pattern in various colors as the deposited film thickness at various points on the glass surface will vary.

*Example 20*

If a pale green glass is used in making a mirror following the procedure for Example 3, the mirror secured is of a beautiful brilliant green. If with this same glass a mirror is made following the procedure of Example 7, instead of a mauve mirror we secure a very brilliant blue-green mirror.

*Example 21*

A piece of opaque black glass was thoroughly cleaned and placed in a high vacuum of the order of $10^{-3}$ mm. A film of calcium fluoride of 0.087 micron thickness was deposited on the glass by thermal evaporation, placing the fluorite on an electrical heated tungsten wire coil and otherwise carrying out the evaporation in the well known manner. The time required is dependent upon the heating of the coil and the distance of the glass from the coil but in most arrangements the desired film thickness can be secured within a few minutes and the time necessary can readily be determined by a few preliminary trials. Uniform deposits are secured by using multiple evaporating electrodes suitably arranged as practiced in the art. The film of this thickness causes interference of the green 5000 Angstrom wave length and the black glass takes on a purplish reflection color from its top or first surface. The coating may be protected by a thin colorless lacquer film. The color developed arises from interference by the transparent thin calcium fluoride layer. While the reflection from this assembly is less than 5%, it is a mirror type reflection and the color is uniform throughout.

Figure 6A:
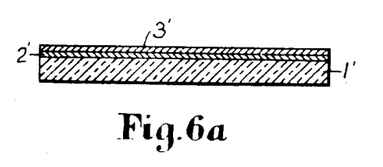
Figure 6a is a similar view showing a modified construction of mirror.

Figure 6a illustrates a first surface mirror made by the above method in which 1' is the opaque black glass, 2' the light interference reflective film, and 3' the colorless film for protecting the light interference reflective film.

*Example 22*

In the high vacuum, we may deposit upon a piece of glass, which has been cut to rear view automotive mirror size and well cleaned, a thin film of lead sulfide of 0.030 micron thickness. The lead sulfide, or granulated galena, may be placed within an electrically heated tungsten wire coil in order to bring about the thermal evaporation which proceeds readily. The mirror has a reflectivity value of 31.7% and an orange yellow color. It is, in all respects, similar to the mirror prepared in Example 4. We may coat the back of this mirror with a black lacquer and other protective coatings. We find that it makes a good rear view mirror for use in automotive vehicles. For this use, we prefer to start with glass which is parallel to within less than 32 seconds of arc so as to avoid troublesome double images.

The mirror produced by the thermal evaporation may also be used as a first surface mirror.

In this case we coat the face of the glass which was not coated with the lead sulfide, with a black lacquer or other dull non-reflective paint to make the mirror opaque. The lead sulfide coated surface is then used as the mirror, the mirror coating being covered for protection with a transparent lacquer coating.

*Example 23*

Gold is readily deposited on a glass support or other suitable support by thermal evaporation within a high vacuum. When so deposited in a film .094 micron thick, interference occurs with the blue light of 4400 Angstroms so that it is reduced from a normal reflectivity of 31% to about 20%. This results in a mirror of a much deeper red shade than is secured with gold when used as a mirror in entirely opaque films.

Thus, mirrors produced as in the above examples will have a desired color and reflectivity value. The color indicated in each example will be the color of the mirror when viewing it directly. When viewing the mirror at different angles, the color might vary depending upon the material used.

It will be apparent from the above description that we have provided colored mirrors or other reflective surfaces of a wide range of color characteristics and of a wide range of reflectivity percentage characteristics which can be controlled as desired. The color values in the reflective mirror films are secured primarily by light interference effects and are permanent and inexpensive.

Various other advantages will be apparent from the preceding description and the following claims.

Having thus described our invention, what we claim is:

1. A mirror having an effective reflectivity to produce an adequate clear reflected image and also producing visually effective color comprising a transparent glass support, a partially transparent continuous light reflective lead sulfide film on a surface of said glass support having a reflectivity greater than that of said glass support and inherently producing color by light ray interference resulting from light transmitted through said film and reflected back through said film and interfering with the light reflected from the front surface of said film, said film having a thickness falling within a range between $$\frac{\lambda}{8N} \text{ and } \frac{3\lambda}{8N}$$

inclusive, in which $\lambda$ represents the wave length of light at which said film element gives a minimum of reflected light by reason of the light of such wave length being removed by interference and N represents the refractive index of said film, and an opaque pigmented material on the surface of said glass support opposite said film and formed of a different material than that of said film, said mirror having an effective reflectivity to produce a reflected image and also inherently producing color by light ray interference, both the image and color being readily visible to the naked eye.

2. A colored mirror having an effective reflectivity to produce an adequate clear reflected image and also producing visually effective color comprising a smooth support means, a partially transparent continuous light interference reflective film element inherently producing color by light ray interference resulting when light incident upon said film element is transmitted through said film element from in front thereof and reflected back through said film element and interferes with the light reflected from the front surface of said film element, said film element having a thickness falling within a range between $$\frac{\lambda}{8N} \text{ and } \frac{9\lambda}{4N}$$

inclusive, in which $\lambda$ represents a wave length of light at which said film element gives a minimum of reflected light and N represents the refractive index of said film element and a smooth substantially light opaque means behind said film element, all of said means and film element being superimposed in fixed relation to each other with said means and film element having their interfaces in intimate contact and one of said film element and substantially opaque means being on a surface of said support means, and said means immediately back of said film element having a refractive index sufficiently different from that of said film element to bring about reflection of light back through said film element.

3. A colored mirror having an effective reflectivity to produce an adequate clear reflected image and also producing visually effective color comprising support means, partially transparent continuous light interference reflective film means inherently producing color by light ray interference resulting when light incident upon said film means is transmitted through said film means from in front thereof and reflected back therethrough and interferes with the light reflected from the front surface thereof, said film means having a thickness falling within a range between $$\frac{\lambda}{8N} \text{ and } \frac{9\lambda}{4N}$$

inclusive, in which $\lambda$ represents a wave length of light at which said film means gives a minimum of reflected light and N represents the refractive index of said film means and substantially light opaque means behind said film means, all of said means being superimposed in fixed relation to each other with adjacent means having their interfaces in intimate contact and one of said substantially opaque and film means being on a surface of said support means and said means immediately back of said film means having a smooth surface in intimate contact with said film means and being of a refractive index sufficiently different from that of said film means to bring about reflection of light back through said film means.

4. A colored mirror having an effective reflectivity to produce an adequate clear reflected image and also producing visually effective color comprising a member having a smooth surface, a partially transparent continuous light interference reflective film in front of and in intimate contact with said surface, and means in rear of said film opaque to the passage of light, said film having a thickness falling within a range between $$\frac{\lambda}{4NR} \text{ and } \frac{9\lambda}{4NR}$$

inclusive, in which $\lambda$ represents a wave length of light at which said film gives a minimum of reflected light, N represents the refractive index of said film, and R represents the number of times the light is reflected within said film, said film inherently producing color by light ray interference resulting when light incident upon said film is transmitted through said film from in front thereof and reflected back therethrough and interferes with the light reflected from the front surface thereof, said member, film and opaque means being superimposed in fixed relation to each other with their adjacent interfaces in intimate contact, said member having a refractive index sufficiently different from that of said film to bring about reflection of light back through said film, the thickness of said film and the difference in the refractive index being so co-related that a substantial part of certain of the spectral waves of the visible spectrum is removed from the light reflected from the mirror to thereby produce a mirror having the desired color effect.

5. A colored mirror having an effective reflectivity to produce an adequate clear reflected image and also producing visually effective color comprising support means, partially transparent continuous light interference reflective film means inherently producing color by light ray interference resulting when light incident upon said film means is transmitted through said film means from in front thereof and reflected back therethrough and interferes with the light reflected from the front surface thereof, said film means having a thickness of about $$\frac{\lambda}{4NR}$$

in which $\lambda$ represents a wave length of light at which said film means gives a minimum of reflected light, $N$ represents the refractive index of said film means, and $R$ represents the number of times the light is reflected within said film means, and substantially light opaque means behind said film means, all of said means being superimposed in fixed relation to each other with adjacent means having their interfaces in intimate contact and one of said substantially opaque and film means being on a surface of said support means and said means immediately back of said film means having a smooth surface in intimate contact with said film means and being of a refractive index sufficiently different from that of said film means to bring about reflection of light back through said film means, the thickness of said film means and the difference in the refractive index being so co-related that a substantial part of certain of the spectral waves of the visible spectrum is removed from the light reflected from the mirror to thereby produce a mirror having the desired color effect.

6. A varicolored mirror having an effective reflectivity to produce an adequate clear reflected image and also producing visually effective color comprising support means, partially transparent continuous light interference reflective film means inherently producing color by light ray interference resulting when light incident upon said film means is transmitted through said film means from in front thereof and reflected back therethrough and interferes with the light reflected from the front surface thereof, said film means having portions of different thickness between $$\frac{\lambda}{4NR} \text{ and } \frac{9\lambda}{4NR}$$

in which $\lambda$ represents a wave length of light at which said film means gives a minimum of reflected light, $N$ represents the refractive index of said film means, and $R$ represents the number of times the light is reflected within said film means, and substantially light opaque means behind said film means, all of said means being superimposed in fixed relation to each other with adjacent means having their interfaces in intimate contact and one of said substantially opaque and film means being on a surface of said support means and said means immediately back of said film means having a smooth surface in intimate contact with said film means and being of a refractive index sufficiently different from that of said film means to bring about reflection of light back through said film means.

7. A colored mirror having an effective reflectivity to produce an adequate clear reflected image and also producing visually effective color comprising a partially transparent continuous light interference mirror film inherently producing color by light ray interference resulting when light incident upon said film is transmitted through said film from in front thereof and reflected back therethrough and interferes with the light reflected from the front surface thereof, said film having a thickness falling within a range between $$\frac{\lambda}{4NR} \text{ and } \frac{9\lambda}{4NR}$$

inclusive, in which $\lambda$ represents a wave length of light at which said film gives a minimum of reflected light, $N$ represents the refractive index of said film, and $R$ represents the number of times the light is reflected within said film, and a substantially opaque element behind said film having a smooth interface in intimate contact with an interface of said film and also having a refractive index sufficiently different from that of said film to bring about reflection of light transmitted through said film from in front thereof back therethrough to interfere with the light reflected from the front surface thereof, the thickness of said film and the difference in the refractive index being so co-related that a substantial part of certain of the spectral waves of the visible spectrum is removed from the light reflected from the mirror to thereby produce a mirror having the desired color effect.

8. A colored mirror having an effective reflectivity to produce an adequate clear reflected image and also producing visually effective color comprising a support element, a partially transparent continuous light interference reflective film element inherently producing color by light ray interference resulting when light incident upon said film element is transmitted through said film element from in front thereof and reflected back therethrough and interferes with the light reflected from the front surface thereof, said film element having a thickness falling within a range between $$\frac{\lambda}{8N} \text{ and } \frac{9\lambda}{4N}$$

inclusive, in which $\lambda$ represents a wave length of light at which said film element gives a minimum of reflected light and $N$ represents the refractive index of said film element, and a substantially opaque coating element behind said film element, all of said elements being superimposed in fixed relation to each other with adjacent elements having their interfaces in intimate contact and one of said film and coating elements being on a surface of said support element and said element immediately back of said film element having a smooth surface in contact with said film element and having a refractive index sufficiently different from that of said film element to bring about reflection of light back through said film element.

9. A colored mirror having an effective reflectivity to produce an adequate clear reflected image and also producing visually effective color comprising a transparent support element, a partially transparent continuous light interference reflective film element on a surface of said support element, said film element inherently producing color by light ray interference resulting when light incident upon said film element is transmitted through said film element from in front thereof and reflected back therethrough and interferes with the light reflected from the front surface thereof, said film element having a thickness falling within a range defined by a relatively low multiple of $$\frac{\lambda}{4NR}$$

in which $\lambda$ represents a wave length of light at which said film element gives a minimum of reflected light, N represents the refractive index of said film element, and R represents the number of times the light is reflected within said film element, and a substantially opaque coating element behind said film element and on the back surface of one of said support and film elements, all of said elements being superimposed in fixed relation to each other with adjacent elements having their interfaces in intimate contact, said element immediately back of said film element having a smooth surface in contact with said film element and having a refractive index sufficiently different from that of said film element to bring about reflection of light back through said film element, the thickness of said film element and the difference in the refractive index being so co-related that a substantial part of certain of the spectral waves of the visible spectrum is removed from the light reflected from the mirror to thereby produce a mirror having the desired color effect.

10. A colored mirror having an effective reflectivity to produce an adequate clear reflected image and also producing visually effective color comprising a transparent support element, a partially transparent continuous light interference reflective film element on a surface of said support element, said film element being of greater reflectivity than that of said support element and inherently producing color by light ray interference resulting when light incident upon said film element is transmitted through said film element from the front thereof and reflected back by and through said film element and interferes with the light reflected from the front surface of said film element, said film element having a thickness falling within a range between $$\frac{\lambda}{4NR} \text{ and } \frac{9\lambda}{4NR}$$

inclusive, in which $\lambda$ represents a wave length of light at which said film element gives a minimum of reflected light, N represents the refractive index of said film element and R represents the number of times the light is reflected within said film element, and a substantially opaque non-reflective coating element behind said film element and on the back surface of one of said support and film elements, all of said elements being superimposed in fixed relation to each other with adjacent elements having their interfaces in contact and said element immediately back of said film element having a smooth surface in contact with said film element and having a refractive index sufficiently different from that of said film element to bring about reflection of light back through said film element.

11. A colored second surface mirror having an effective reflectivity to produce an adequate clear reflected image and also producing visually effective color comprising a transparent support element, a partially transparent continuous light interference reflective film element on the back surface of said support element, said film element inherently producing color by light ray interference resulting when light incident upon said film element is transmitted through said film element from in front thereof and reflected back therethrough and interferes with the light reflected from the front surface of said film element, said film element having a predetermined thickness between .024 and .065 micron inclusive, and a substantially opaque coating element behind and on the back surface of said film element, said support, film and coating elements being superimposed in fixed relation to each other with adjacent elements having their interfaces in contact and said coating element having a smooth surface in contact with said film element and having a refractive index sufficiently different from that of said film element to bring about reflection of light back through said film element.

12. A colored second surface mirror having an effective reflectivity to produce an adequate clear reflected image and also producing visually effective color comprising a transparent support element, a partially transparent continuous light interference reflective film element on the back surface of said support element, said film element being of greater reflectivity than that of said support element and inherently producing color by light ray interference resulting when light incident upon said film element is transmitted through said film element from in front thereof and reflected back through said film element and interferes with the light reflected from the front surface thereof, said film element having a thickness of about $$\frac{\lambda}{4NR}$$

in which $\lambda$ represents a wave length of light between approximately 4000 and 7500 Angstrom units at which said film element gives a minimum of reflected light, N represents the refractive index of said film element, and R represents the number of times the light is reflected within said film element, and a substantially opaque coating element behind and on the back surface of said film element and having a smooth surface in contact with said film element and also having a refractive index sufficiently different from that of said film element to bring about reflection of light back through said film element, said support, film and coating elements being superimposed in fixed relation to each other with adjacent elements having their interfaces in intimate contact, the thickness of said film element and the difference in the refractive index being so co-related that a substantial part of certain of the spectral waves of the visible spectrum is removed from the light reflected from the mirror to thereby produce a mirror having the desired color effect.

13. A colored mirror having an effective reflectivity to produce an adequate clear reflected image and also producing visually effective color comprising support means, partially transparent continuous light interference reflective lead sulphide film means inherently producing color by light ray interference resulting when light incident upon said film means is transmitted through said film means from in front thereof and reflected back therethrough and interferes with the light reflected from the front surface thereof, said film means having a thickness falling within a range between $$\frac{\lambda}{8N} \text{ and } \frac{3\lambda}{8N}$$

inclusive, in which $\lambda$ represents a wave length of light at which said film means gives a minimum of reflected light and N represents the refractive index of said film means, and substantially light opaque means behind said film means, all of said means being superimposed in fixed relation to each other with adjacent means having their interfaces in intimate contact and one of said substantially opaque and film means being on a surface of said support means and said means immediately back of said film means having a smooth surface in intimate contact with said film means and being of a refractive index sufficiently different from that of said film means to bring about reflection of light back through said film means.

14. A colored mirror having an effective reflectivity to produce an adequate clear reflected image and also producing visually effective color comprising support means, partially transparent continuous light interference reflective gold film means inherently producing color by light ray interference resulting when light incident upon said film means is transmitted through said film means from in front thereof and reflected back therethrough and interferes with the light reflected from the front surface thereof, said film means having a thickness of about $$\frac{\lambda}{4N}$$

in which $\lambda$ represents a wave length of light at which said film means gives a minimum of reflected light and N represents the refractive index of said film means, and substantially light opaque means behind said film means, all of said means being superimposed in fixed relation to each other with adjacent means having their interfaces in intimate contact and one of said substantially opaque and film means being on a surface of said support means and said means immediately back of said film means having a smooth surface in intimate contact with said film means and being of a refractive index sufficiently different from that of said film means to bring about reflection of light back through said film means.

15. A colored mirror having an effective reflectivity to produce an adequate clear reflected image and also producing visually effective color comprising support means, partially transparent continuous light interference reflective copper film means inherently producing color by light ray interference resulting when light incident upon said film means is transmitted through said film means from in front thereof and reflected back therethrough and interferes with the light reflected from the front surface thereof, said film means having a thickness of about $$\frac{\lambda}{4N}$$

in which $\lambda$ represents a wave length of light at which said film means gives a minimum of reflected light and N represents the refractive index of said film means, and substantially light opaque means behind said film means, all of said means being superimposed in fixed relation to each other with adjacent means having their interfaces in intimate contact and one of said substantially opaque and film means being on a surface of said support means and said means immediately back of said film means having a smooth surface in intimate contact with said film means and being of a refractive index sufficiently different from that of said film means to bring about reflection of light back through said film means.

WILLIAM H. COLBERT.
WILLARD L. MORGAN.

REFERENCES CITED

The following references are of record in the file of this patent:

UNITED STATES PATENTS

| Number | Name | Date |
| --- | --- | --- |
| 2,281,474 | Cartwright et al. | Apr. 28, 1942 |
| Re. 22,076 | Cartwright et al. | Apr. 21, 1942 |
| 1,951,214 | Schlumbohm | Mar. 13, 1934 |
| 2,338,233 | Dimmick | Jan. 4, 1944 |
| 1,199,882 | Frey | Oct. 3, 1916 |
| 809,698 | Kelley | Jan. 9, 1906 |
| 1,008,902 | Haehnel | Nov. 14, 1911 |
| 2,079,784 | Williams | May 11, 1937 |
| 1,603,936 | Colbert et al. | Oct. 19, 1926 |
| 1,698,307 | LaHodny | Jan. 8, 1929 |
| 2,379,790 | Dimmick | July 3, 1945 |
| 2,329,532 | Harshaw | Sept. 14, 1943 |
| 1,425,967 | Hoffman | Aug. 15, 1922 |

OTHER REFERENCES

Dimmick, "A New Dichroic Reflector and its Application to Photocell Monitoring Systems," Journal of Society of Motion Picture Engineers, vol. XXXVIII, January, 1942, pages 36–44.

Edwards, "Interference in Thin Metallic Films," Physical Review, July 1, 1931 (volume 38), pages 166–173.

Cartwright et al., "Multilayer Films of High Reflecting Power," Physical Review, June, 1939, page 1128, No. 92.

Pfund, "Highly Reflecting Films of Zinc Sulphide," Journal of the Optical Society of America, vol. 24, April, 1934, pages 99–102.